Sept. 16, 1958   H. F. MEADOR   2,851,968
PIE EDGE CRIMPING DEVICE
Filed March 1, 1957

Henry F. Meador
INVENTOR.

BY
Attorneys

United States Patent Office 2,851,968
Patented Sept. 16, 1958

2,851,968
PIE EDGE CRIMPING DEVICE
Henry F. Meador, Naturita, Colo.
Application March 1, 1957, Serial No. 643,307
1 Claim. (Cl. 107—49)

The present invention relates to pastry and dough implements, generally classified, and has reference to that category of hand implements now commonly referred to in the trade and elsewhere as pie dough forming and crimping devices.

As the preceding general statement of the nature of the invention implies, manually usable dough corrugating and fluting devices used for pie crimping purposes are not new. For example, a typical prior art adaptation is the Pakaluk et al. Patent 2,619,053 of November 25, 1952. Like the instant invention, the prior patent is characterized by a plate-like or equivalent body structure having, among other features, one or more depending molding or forming fingers. These serve as dough bending and corrugating fingers and to this extent have a bearing on the present invention.

The instant concept has to do with a simple and expedient plate which constitutes the body member and which is fashioned into a suitable hand grip. It is also provided with a depending flange which constitutes an abutment and which facilitates the step of riding the crimper in a step by step manner around the peripheral edge of the pie tin rim and which therefore performs in conjunction with overhanging projections. The projections are novel in that they are spaced apart and have their vertical portions and marginal surfaces shaped to give the desired contour to the portions of the dough contacted thereby. The invention features also the spaces between the projections which facilitate the necessary step whereby the user actually molds the dough around the projections or fingers using her own finger in doing so.

Other objects, features and advantages will become more readily apparent from the following description and the accompanying drawing.

In the drawing, wherein like numerals are employed to designate like parts throughout the views.

Figure 1:
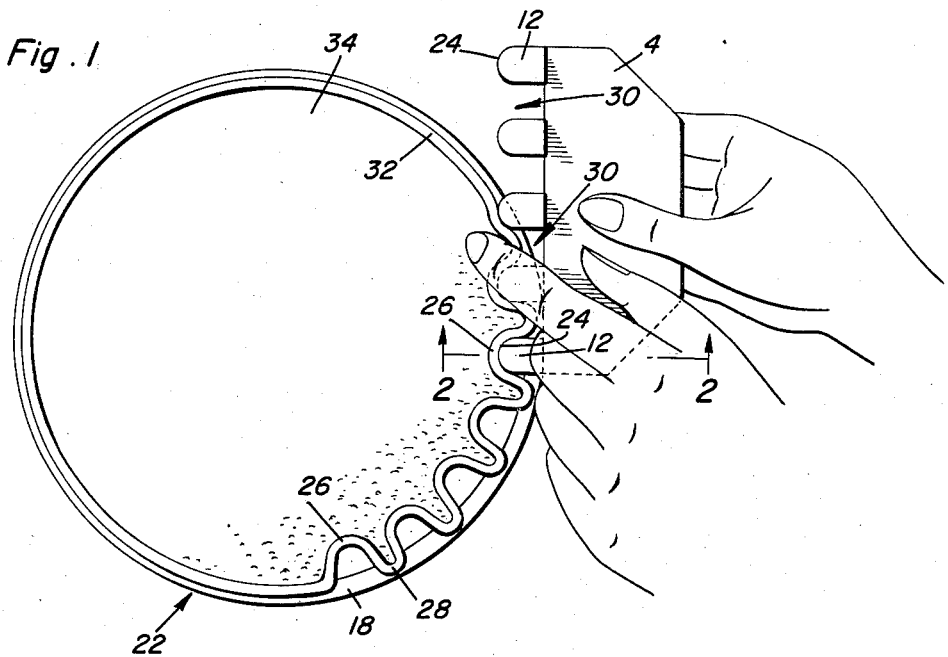
Fig. 1 is a plan view of the dough or pie crimping device showing how it is constructed and used.
Figure 2:
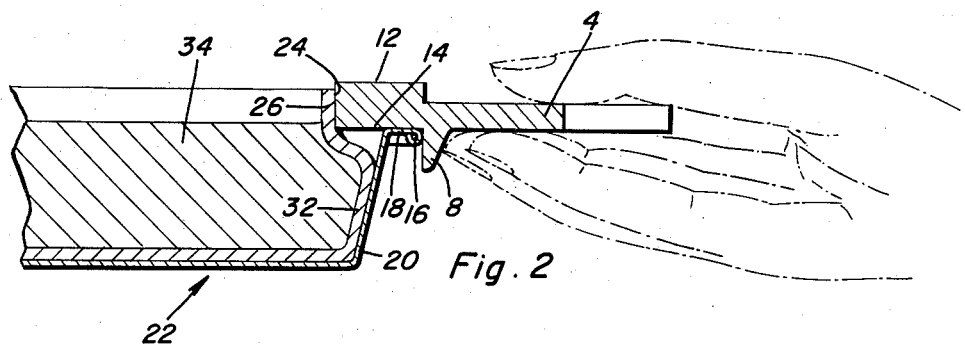
Fig. 2 is a section on the plane of the line 2—2 of Fig. 1 looking in the direction of the arrows.
Figure 3:
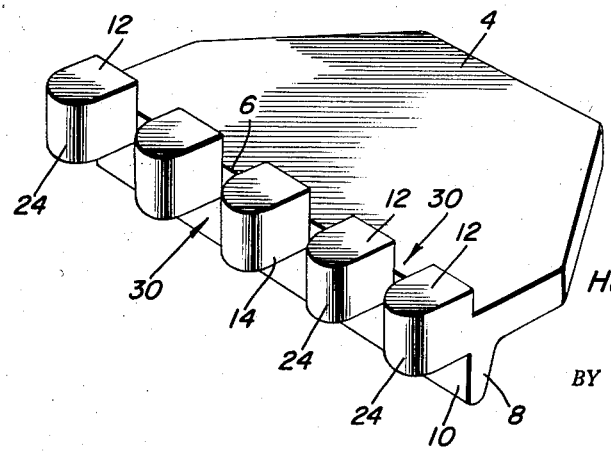
Fig. 3 is a perspective view of the device by itself.

As is clear from Fig. 3, the device is preferably a simple, practical and economical structural entity. In fact, one may think of it as a body which is characterized by a flat-faced plate portion of suitable size and shape in plan. This plate portion is here denoted by the numeral 4 and constitutes either a hand grip or a handle and is used in the manner as evident from Figs. 1 and 2. Along its forward longitudinal edge 6 it is provided with a depending flange 8 having a perpendicular flat surface 10 which constitutes an abutment. The flange is commensurate in length with the forward edge portion 6 of the plate. Joined integrally with and projecting outwardly or forwardly beyond the edge 6 are longitudinally spaced block-like projections 12. These overhang the abutment, that is, the bottom surfaces 14 are in a plane above the effective guiding face constituting the abutment 10. The latter in practice is placed against the bead 16 of the outstanding flange 18 on the rim 20 of the pie tin 22 in the manner seen in Figs. 1 and 2. The elevated surfaces 14 are at right angles to the abutment and serve as rests and ride on the flange 18. Primarily, the spaced apart, coplanar projections serve as dough forming or shaping members, sometimes also referred to as fingers. Consequently, the vertical marginal surfaces thereof are appropriately smooth and rounded or otherwise shaped, as at 24, so that the shape embodied is imparted to the dough in the manner shown to define the corrugations 26 which, together with the intervening bends 28, provide the desired crimped effect. The spaces 30 between the shaping and forming projections are sufficient to enable the user to employ her own finger in the manner shown. More specifically and in practice, the plate is gripped and held in the right hand, as seen in Fig. 1, and the index finger of the left hand is used in conjunction with the spaces 30. The marginal wall of the dough shell is denoted at 32 and the pie filling at 34.

With the construction shown the user can press the abutment against the bead 16 in the manner illustrated in the drawings and the device will ride in a step by step manner around the bead. Practice has shown that the crimper is fast, leakproof and is such in over-all appearance that it can be finished in attractive and appealing form. Generally all pies in the custard or open-face category, because of the high crimp involved, can be filled one-quarter of an inch above the pie pan rim. All finger crimps can push dough out and beyond the pie rim in order to compensate for shrinkage. For pie shells every sixth crimp can be slightly turned out under the pie tin rim to also cope with the shrinkage problem.

It will also be clear that with the construction herein shown and described the projections may be employed, singly or collectively, to aid one in kneading the dough to increase or decrease the thickness thereof so that the final crimped edge will appear to be of uniform thickness throughout. In this connection it is to be pointed out that when dough is rolled it is sometimes of greater thickness at one area than at the other area and hence when the finished crimping job is done some of the crimps or bends are much thinner than the others. With the shaping projections this defect in shape, if it be such, is capable of being nicely handled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A device for crimping the upright edge of an open pie crust shell above the rim of a pie pan comprising a flat plate forming a hand grip and having a straight longitudinal front edge, a row of blocks extending forwardly from said edge for projection over and resting upon a rim of a pie pan against an upper edge of a pie crust shell and being spaced apart and separated sufficiently to provide for the upper edge of a pie crust shell being pressed by a finger in between said blocks to crimp said edge, said blocks extending above said plate to facilitate crimping, and a straight flange depending from said edge of the plate along said edge for engaging an edge of a pie pan rim and rocking thereagainst to rock said row of blocks to extend the blocks progressively over a pie pan rim.

References Cited in the file of this patent
UNITED STATES PATENTS

| 2,086,464 | Brown | July 6, 1937 |
| 2,611,328 | Roman | Sept. 23, 1952 |
| 2,619,053 | Pakaluk et al. | Nov. 25, 1952 |